United States Patent
Li et al.

(10) Patent No.: US 9,736,698 B2
(45) Date of Patent: *Aug. 15, 2017

(54) PARTITIONING A COORDINATION AREA IN A WIRELESS NETWORK

(71) Applicant: INTERNATIONAL BUSINESS MACHINES CORPORATION, Armonk, NY (US)

(72) Inventors: Mingqiang Li, Beijing (CN); Yonghua Lin, Beijing (CN); Chao Xue, Beijing (CN); Rong Yan, Beijing (CN); Hai Zhan, Beijing (CN); Chao Zhu, Beijing (CN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/225,855

(22) Filed: Aug. 2, 2016

(65) Prior Publication Data

US 2016/0345180 A1      Nov. 24, 2016

Related U.S. Application Data

(63) Continuation of application No. 14/388,225, filed as application No. PCT/CN2013/073323 on Mar. 28, 2013, now Pat. No. 9,503,904.

(30) Foreign Application Priority Data

Mar. 29, 2012    (CN) .......................... 2012 1 0089580

(51) Int. Cl.
*H04W 40/00*    (2009.01)
*H04W 16/12*    (2009.01)
*H04W 16/30*    (2009.01)

(52) U.S. Cl.
CPC ........... *H04W 16/12* (2013.01); *H04W 16/30* (2013.01)

(58) Field of Classification Search
USPC ....................... 455/404.2, 432.1, 435.1–453, 455/456.1–456.3; 370/329, 330, 331,
(Continued)

(56) References Cited

U.S. PATENT DOCUMENTS 5,649,292 A * 7/1997 Doner ................... H04W 16/02
                                                                455/447
5,722,043 A * 2/1998 Rappaport ............ H04W 16/06
                                                                455/447
(Continued)

OTHER PUBLICATIONS

List of IBM Patents or Patent Applications Treated as Related; (Appendix P), Date Filed Aug. 2, 2016 2 pages.
(Continued)

*Primary Examiner* — Dai A Phuong
(74) *Attorney, Agent, or Firm* — Cantor Colburn LLP; David Quinn

(57) ABSTRACT

The present invention relates to a wireless network, and more specifically, to a method and apparatus for partitioning a coordination area in a wireless network, the method comprising: obtaining antenna directions of respective cells, base station locations of respective cells, and scope of a coordination area within the wireless network; determining an initial coordination area based on the scope of the coordination area and the base station locations in respective cells; partitioning the initial coordination area into an inner area and an outer area; partitioning the outer area into an inward area and an outward area based on the antenna directions of cells within the outer area and the base station locations of cells within the outer area; and combining the inner area and the inward area within the outer area into a new coordination area. The method is simple and easy. It
(Continued)

may solve a problem of coordination area edge caused by partitioning a coordination area and meanwhile avoid the association between coordination areas, thereby reducing the complexity of scheduling.

12 Claims, 8 Drawing Sheets

(58) Field of Classification Search
USPC .......................................... 370/332, 333, 334
See application file for complete search history.

(56) References Cited

U.S. PATENT DOCUMENTS

| | | | | |
|---|---|---|---|---|
| 6,459,895 | B1* | 10/2002 | Hastings | H04B 7/0491 |
| | | | | 455/424 |
| 8,055,303 | B2* | 11/2011 | Wild | H01Q 1/246 |
| | | | | 370/329 |
| 8,428,594 | B2* | 4/2013 | Laroia | H04W 36/0072 |
| | | | | 370/210 |
| 2006/0252461 | A1* | 11/2006 | Grant | H01Q 1/246 |
| | | | | 455/562.1 |
| 2008/0194267 | A1* | 8/2008 | Ahn | H04B 7/15542 |
| | | | | 455/450 |
| 2008/0232320 | A1* | 9/2008 | Lee | H04W 16/10 |
| | | | | 370/329 |
| 2010/0039951 | A1* | 2/2010 | She | H04B 7/024 |
| | | | | 370/252 |
| 2012/0052897 | A1* | 3/2012 | Senarath | H04W 16/02 |
| | | | | 455/509 |
| 2012/0329508 | A1* | 12/2012 | Kanerva | H04W 64/00 |
| | | | | 455/517 |
| 2013/0337858 | A1* | 12/2013 | Zhang | H04W 16/02 |
| | | | | 455/509 |

OTHER PUBLICATIONS

U.S. Appl. No. 14/388,225, filed Sep. 25, 2014; Entitled: Partitioning a Coordination Area in a Wireless Network.

* cited by examiner

PARTITIONING A COORDINATION AREA IN A WIRELESS NETWORK

DOMESTIC AND PRIORITY INFORMATION

This application is a continuation of U.S. application Ser. No. 14/388,225 filed Sep. 25, 2014, 35 U.S.C. §371 from PCT Application PCT/CN2013/073323, filed on Mar. 28, 2013, which claims priority to Chinese Patent Application No. 201210089580.7, filed Mar. 29, 2012, and all the benefits accruing therefrom under 35 U.S.C. §119, the contents of which in its entirety are herein incorporated by reference.

TECHNICAL FIELD

The present invention relates to a wireless network, and more specifically, to a method and apparatus for partitioning a coordination area in the wireless network.

BACKGROUND

With increasing demands on wireless network data traffics, it has become a focus of concern in next generation of wireless network how to improve system throughput and spectral efficiency to the utmost. Coordination between base stations is an important technology for fully achieving the potential capacity of a system. An inter-cell interaction enables fully utilization of local information of each cell, coordinative scheduling of network resources, and achievement of better global performance. However, the first step of coordination is to determine the coordination area, as well as base stations and cells to be coordinated.

Generally, there are three approaches to determine the cells to be coordinated: determining by network, determining by user, and tradeoff therebetween. The approach of determining by network means all coordination cells are partitioned by the network in advance, such that once a user locates in a certain cell, it has to coordinate with other cells that have already been defined in advance, and it cannot make selection according to the strength of the signal received by the user. This approach has an advantage of relative simplicity, but its drawbacks are rather apparent: the coordination performance is greatly limited. The approach of determining by user means all coordination cells are determined by the user in real-time, such that once the user locates in a certain cell, he/she may freely select a coordination cell according to the strength of the signal received by himself/herself. This approach has an advantage of improved coordination performance, but the coordination transmission between cells will further increase the complexity of scheduling network resources and the workload of network information interaction. The coordination transmission requires that different cells simultaneously perform transmission to the user; thus, it is require to negotiate between cells how to allocate wireless resources such as antennas, sub-carriers, and power of respective cells. However, as a node of the entire network, the decision of each cell is not only restrained by its neighboring cells, but also affects the decision of the neighboring cells; in light of the adjacency of cells, such impact will inevitably spread throughout the entire network, thereby causing an extremely complex problem in scheduling resources throughout the whole network. In view of the above drawbacks, an approach of tradeoff therebetween evolves. According to this tradeoff approach, first the network is partitioned into coordination areas such that the complexity of scheduling wireless resources is restricted within acceptable scope, and then within respective areas, the user determines the actual coordination cells.

However, this tradeoff approach further causes a problem that a coordination area-edge user cannot coordinate with a neighboring cell that belongs to another coordination area, which therefore dampens the performance of the coordination area-edge user. In order to solve the above problem, another approach is proposed, the basic idea of which is to make the cell at the coordination area-edge as an overlapping cell of two coordination areas, and then through the negotiation between the two areas, the coordination transmission to the user in the overlapping area is handled. Although this approach relieves the edge effect of the coordination areas to a certain extent, it essentially still needs the interaction between different coordination areas, coupling still exists between the coordination areas, and the complexity of scheduling still exists.

Therefore, a simple and easy method of partitioning a coordination area is desired.

SUMMARY

In view of the above problems, the present invention provides a method and apparatus for partitioning a coordination area in a wireless network.

According to a first aspect of the present invention, there is provided a method of partitioning a coordination area in a wireless network, comprising: obtaining antenna directions of respective cells, base station locations of respective cells, and scope of a coordination area within the wireless network; determining an initial coordination area based on the scope of the coordination area and the base station locations in respective cells; partitioning the initial coordination area into an inner area and an outer area; partitioning the outer area into an inward area and an outward area based on the antenna directions of cells within the outer area and the base station locations of cells within the outer area; and combining the inner area and the inward area within the outer area into a new coordination area.

According to a second aspect of the present invention, there is provided an apparatus for partitioning a coordination area in a wireless network, comprising: an obtaining module configured to obtain antenna directions of respective cells, base station locations of respective cells, and scope of a coordination area within the wireless network; an initial coordination area determining module configured to determine an initial coordination area based on the scope of the coordination area and the base station locations in respective cells; an initial coordination area partitioning module configured to partition the initial coordination area into an inner area and an outer area; an outer area partitioning module configured to partition the outer area into an inward area and an outward area based on the antenna directions of cells within the outer area and the base station locations of cells within the outer area; and a new coordination area producing module configured to combine the inner area and the inward area within the outer area into a new coordination area.

The present invention provides a simple and easy method of partitioning a coordination area in a wireless network, such that it may solve a problem of coordination area edge caused by partitioning a coordination area and meanwhile avoid the association between coordination areas, thereby reducing the complexity of scheduling.

DETAILED DESCRIPTION

Through the more detailed description of some embodiments of the present disclosure in the accompanying drawings, the above and other objects, features and advantages of the present disclosure will become more apparent, wherein.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus it should not be construed as being limited to the embodiments disclosed herein. On the contrary, those embodiments are provided for the thorough and complete understanding of the present disclosure, and completely conveying the scope of the present disclosure to those skilled in the art.

Figure 1:
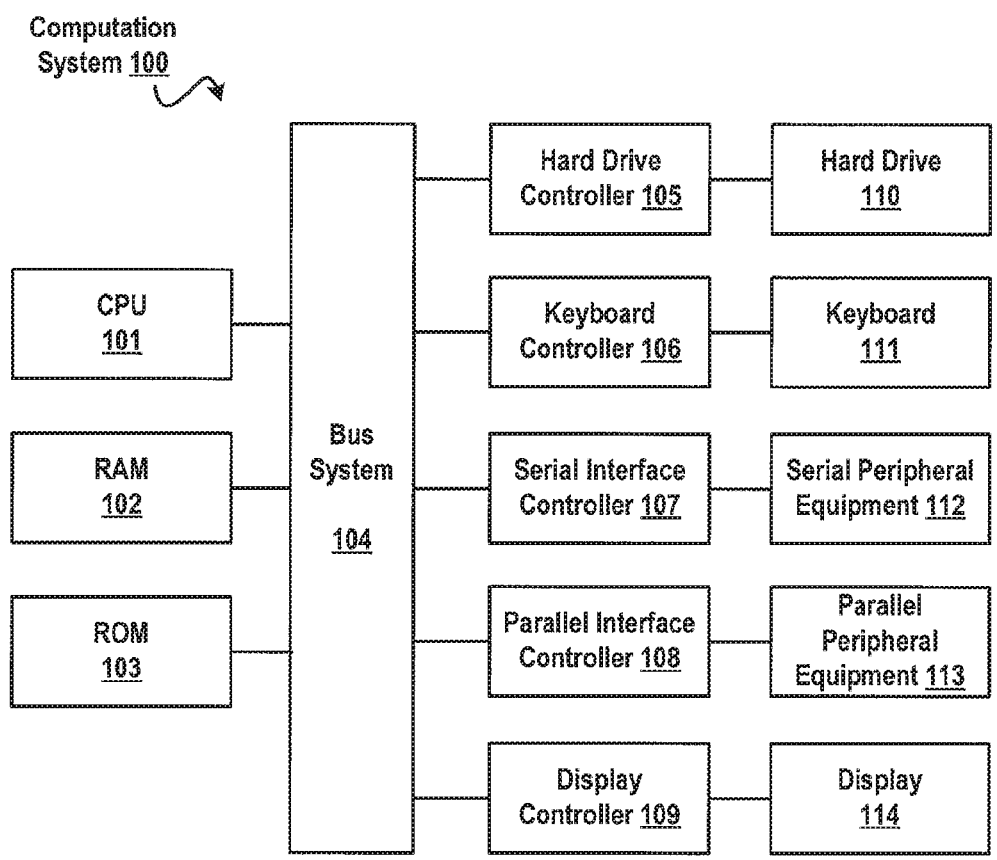
FIG. 1 illustrates an exemplary computer system 100 which is applicable to implement the embodiments of the present invention.

FIG. 1 illustrates an exemplary computer system 100 which is applicable to implement the embodiments of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or one embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
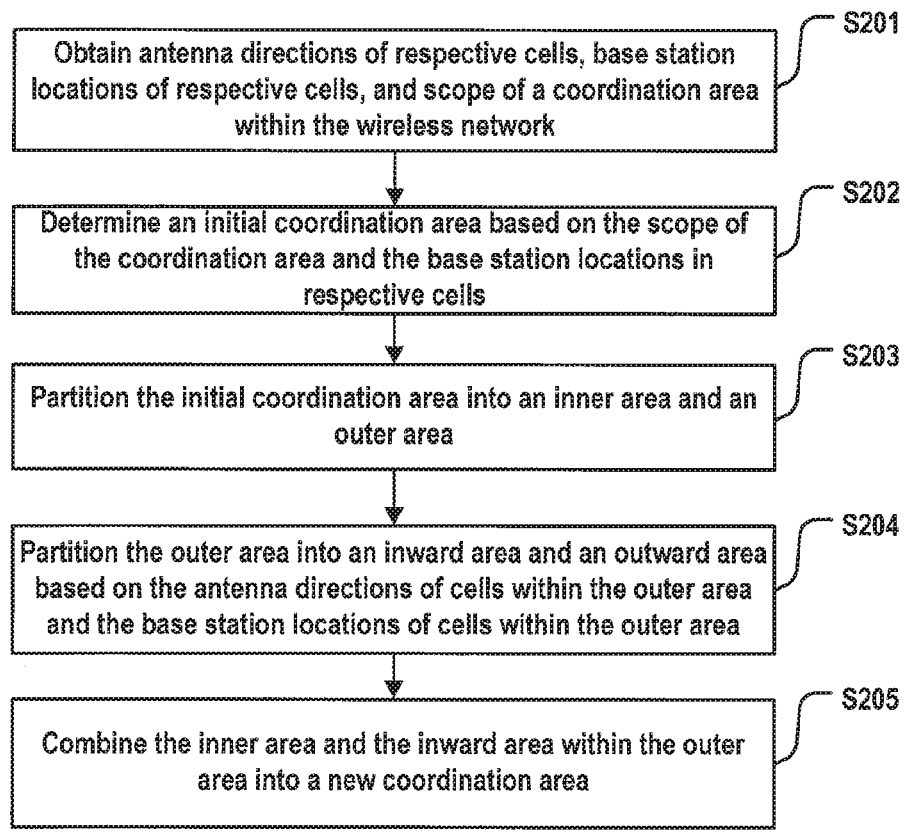
FIG. 2 illustrates a method of partitioning a coordination area according to the embodiments of the present invention.

FIG. 2 illustrates a method of partitioning a coordination area in a wireless network according to embodiments of the present invention, comprising: step S201 of obtaining antenna directions of respective cells, base station locations of respective cells, and scope of a coordination area within the wireless network; step S202 of determining an initial coordination area based on the scope of the coordination area and the base station locations in respective cells; step S203 of partitioning the initial coordination area into an inner area and an outer area; step S204 of partitioning the outer area into an inward area and an outward area based on the antenna directions of cells within the outer area and the base station locations of cells within the outer area; and step S205 of combining the inner area and the inward area within the outer area into a new coordination area.

At step S201, antenna directions of respective cells, base station locations of respective cells, and scope of a coordination area within the wireless network are obtained, wherein the scope of coordination area determines the number of cells that constitute the coordination area. The above parameters are set by a network operator when conducting network planning and can be obtained from the network operator.

At step S202, an initial coordination area is determined based on the scope of the coordination area and the base station locations in respective cells.

At step S203, the initial coordination area is partitioned into an inner area and an outer area, wherein the inner area comprises a cell that is within the initial coordination area but not adjacent to other coordination areas, and the outer area comprises a cell that is within the initial coordination area and adjacent to other coordination areas.

At step S204, the outer area is partitioned into an inward area and an outward area based on the antenna directions of cells within the outer area and the base station locations of cells within the outer area. Specifically, a connection line is made between a base station location of a cell within the outer area as a start point and a center of the initial coordination area as an end point, wherein if an angle between the connection line and a direction of an antenna of the cell within the outer area is acute, the area governed by the antenna of the cell belongs to the inward area; if an angle between the connection line and a direction of an antenna of the cell within the outer area is right or obtuse, the area governed by the antenna of the cell belongs to the outward area.

At step S205, the inner area and the inward area within the outer area are combined into a new coordination area. The channel quality between a user in a present coordination cell and the antenna governing the outward area within the outer area is usually very poor, the probability of selecting an antenna of the outward area to coordinate is quite low, and thus the outward area of the outer area is excluded when determining the new coordination area.

Figure 3:
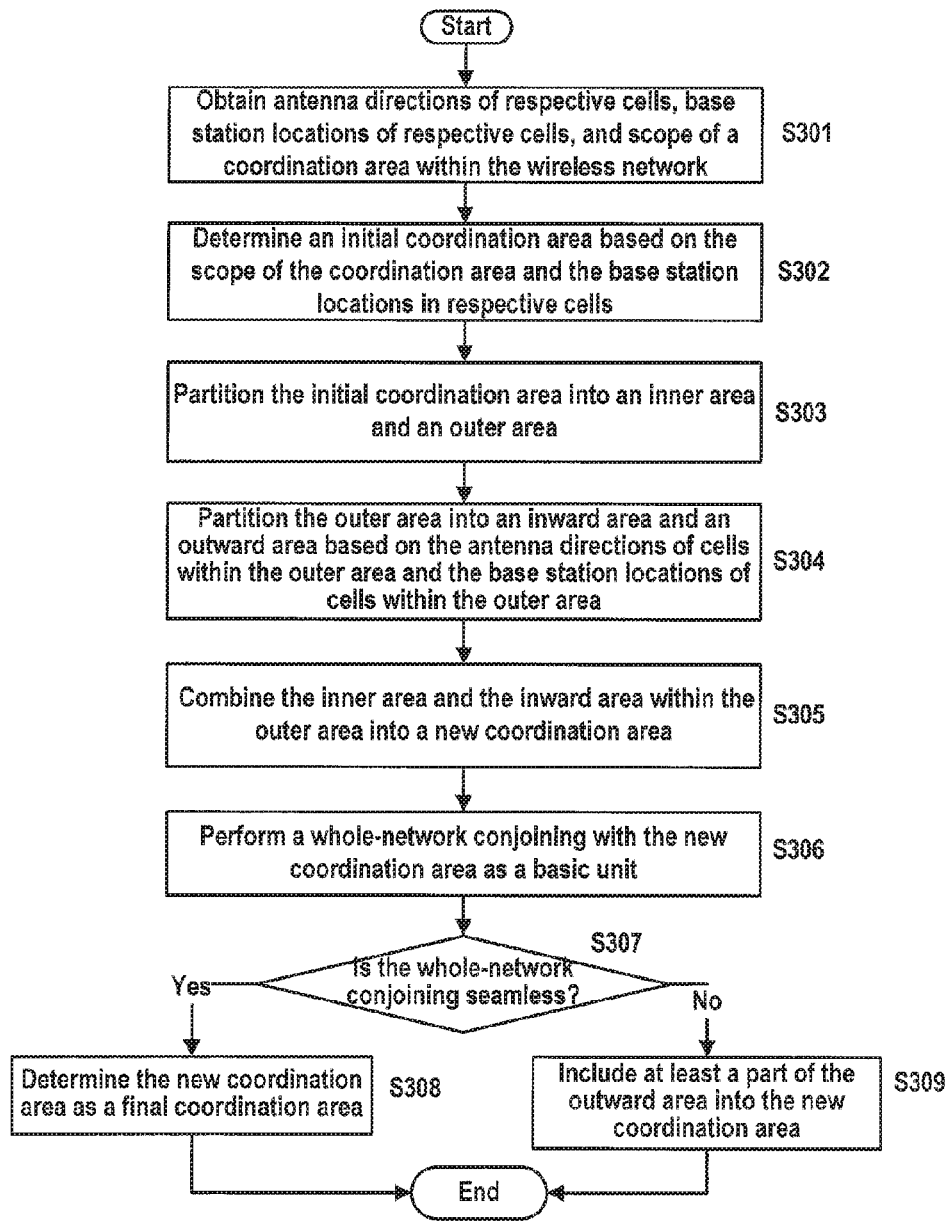
FIG. 3 illustrates a flow chart of a method of partitioning a coordination area according to the embodiments of the present invention.

FIG. 3 illustrates a flow chart of a method of partitioning a coordination area according to the embodiments of the present invention. At step S301, antenna directions of respective cells, base station locations of respective cells, and scope of a coordination area within the wireless network are obtained; at step S302, an initial coordination area is determined based on the scope of the coordination area and the base station locations in respective cells; at step S303, the initial coordination area is partitioned into an inner area and an outer area; at step S304, the outer area is partitioned into an inward area and an outward area based on the antenna directions of cells within the outer area and the base station locations of cells within the outer area; at step S305, the inner area and the inward area within the outer area are combined into a new coordination area; at step 306, a whole-network conjoining is performed with the new coordination area as a basic unit; at step S307, it is determined whether the whole-network conjoining is seamless, if the determining result is "yes," then at step S308, the new coordination area are determined as a final coordination area; if the determining result is "no," then at step S309, at least a part of the outward area is included into the new coordination area so as to form a seamless whole-network conjoining.

Embodiment I

Figure 4:
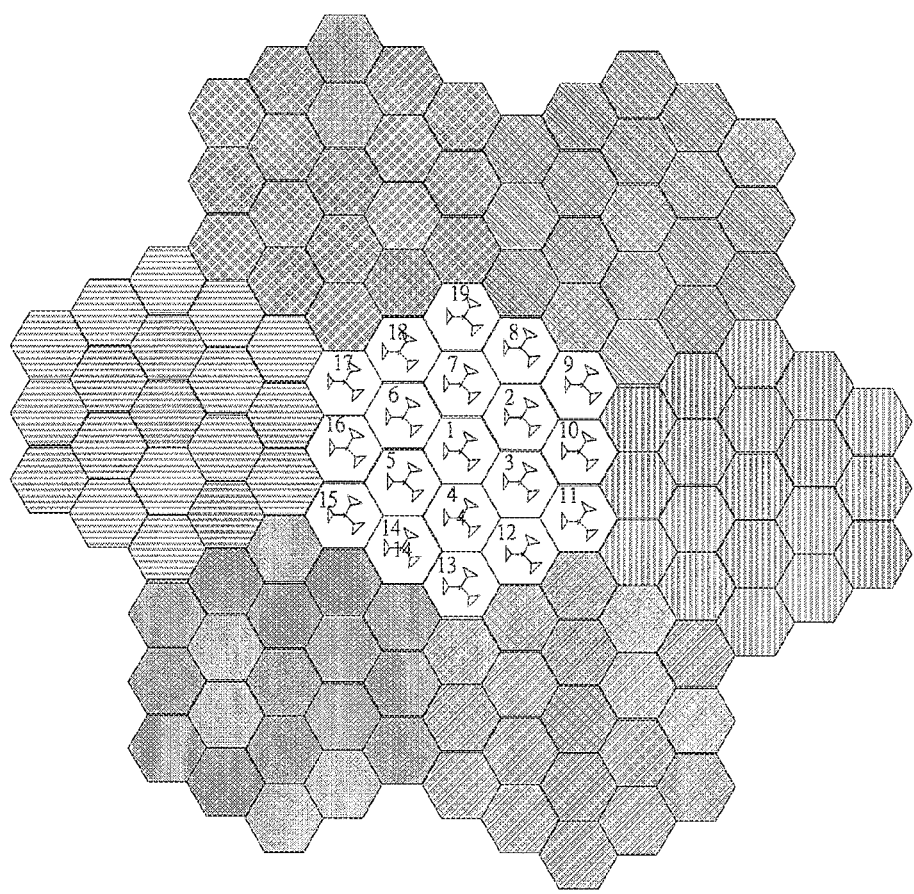
FIG. 4 illustrates a schematic diagram of partitioning an initial coordination area according to a first embodiment of the present invention.

FIG. 4 illustrates a schematic diagram of partitioning an initial coordination area according to a first embodiment of the present invention. In FIG. 4, 7 initial coordination areas of the whole wireless network are determined based on the scope of the coordination areas and base station locations of respective cells within the wireless network, wherein the 7 initial coordination areas are identified by different line types, respectively. With the initial coordination area at the center as an example, the initial coordination area comprises cells 1 to 19, wherein cells 1 to 7 are not adjacent to other initial coordination areas; thus, cells 1 to 7 form an inner area of the initial coordination area; cells 8 to 19 are respectively adjacent to other coordination areas, and thus cells 8 to 19 form an outer area of the initial coordination area.

Figure 5:
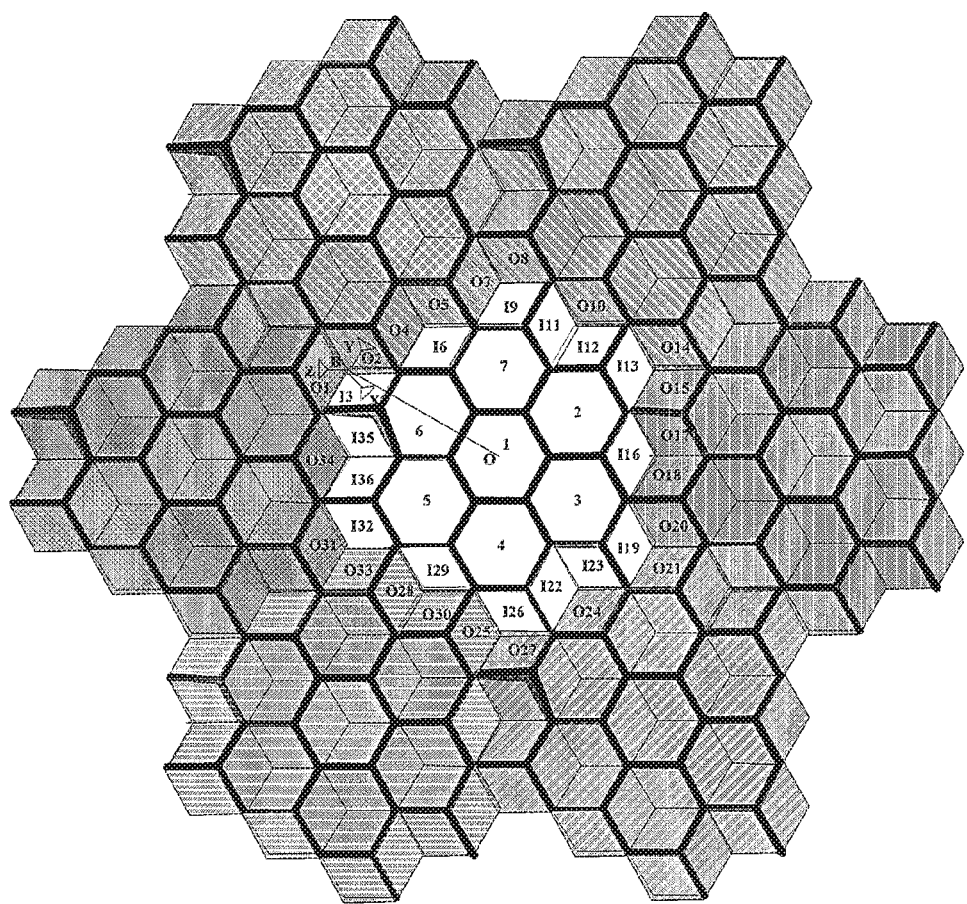
FIG. 5 illustrates a schematic diagram of partitioning an outer area according to a first embodiment of the present invention.

FIG. 5 illustrates a schematic diagram of partitioning an outer area according to a first embodiment of the present invention, wherein cells 8 to 19 within the outer area as illustrated in FIG. 3 are partitioned. As illustrated in FIG. 5, the antenna directions of the cells within the outer area are directions X, Y, and Z, respectively. With cell 17 within the outer area as illustrated in FIG. 3 as an example, a connection line BO is made between the base station location B as a start point and a center O of the coordination area as an end point, and the antenna direction X and the connection line BO forms an acute angle, so the area I3 governed by the antenna with the direction X belongs to an inward area; the antenna direction Y and the connection line BO forms a right angle, so the area O2 governed by the antenna with the direction Y belongs to an outward area; the antenna direction Z and the connection line BO form an obtuse angle, so the area O1 governed by the antenna with the direction Z belongs to the outward area. According to the above approach, other cells within the outer area are partitioned into the outward area and the inward area. Finally, the outward area comprises: O1, O2, O4, O5, O7, O8, O10, O14, O15, O17, O18, O20, O21, O24, O25, O27, O28, O30, O31, O33, and O34, and the inward area comprises: I3, I6, I9, I11, I12, I13, I16, I19, I23, I22, I26, I29, I32, I35, and I36.

Afterwards, according to step S105, the initial coordination area comprising cells 1 to 19 is re-determined as a new coordination area including the following cells and area: cells 1 to 7 and the inward area comprising I3, I6, I9, I11, I12, I13, I16, I19, I23, I22, I26, I29, I32, I35, and I36.

Finally, a whole-network conjoining is performed with the new coordination area as the basic unit. Because the whole-network conjoining is seamless, 7 coordination areas are finally determined. Different line types are used in FIG. 5 to distinguish the 7 coordination areas, respectively.

Embodiment II

Figure 6:
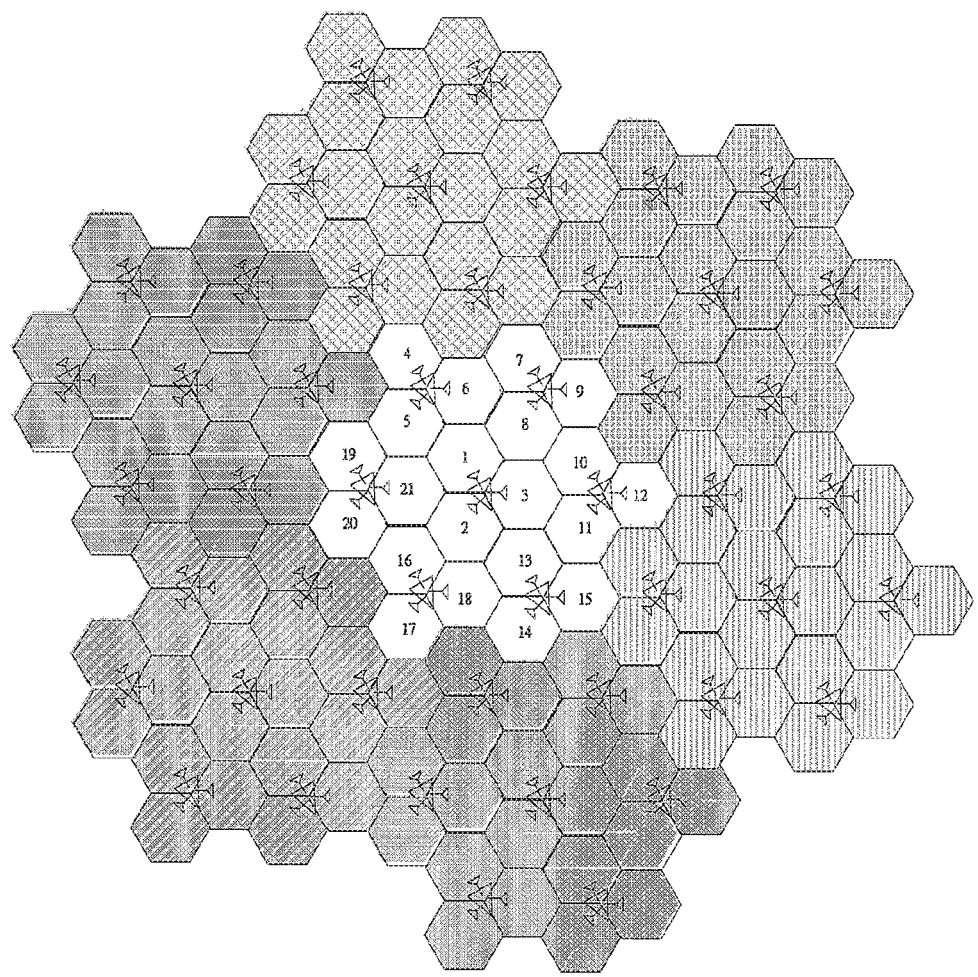
FIG. 6 illustrates a schematic diagram of partitioning an initial coordination area according to a second embodiment of the present invention.

FIG. 6 illustrates a schematic diagram of partitioning an initial coordination area according to a second embodiment of the present invention. In FIG. 6, 7 initial coordination areas are determined based on the scope of coordination areas and base station location of respective cells within the wireless network, wherein the 7 initial coordination areas are identified by different line types, respectively. In the wireless network of this embodiment, three cells share one base station. With the initial coordination area at the center as an example, the initial coordination area comprises cells 1 to 21. The cells 1 to 21 are managed and controlled by 7 base stations, wherein cells 1, 2, 3, 8, 13 and 21 are not adjacent to other initial coordination areas; thus, cells 1, 2, 3, 8, 13 and 21 form the inner area of the initial coordination area; cells 4, 5, 6, 7, 9, 10, 11, 12, 14, 15, 16, 17, 18, 19 and 20 are adjacent to other coordination areas, so cells 4, 5, 6, 7, 9, 10, 11, 12, 14, 15, 16, 17, 18, 19 and 20 form an outer area of the initial coordination area.

Figure 7:
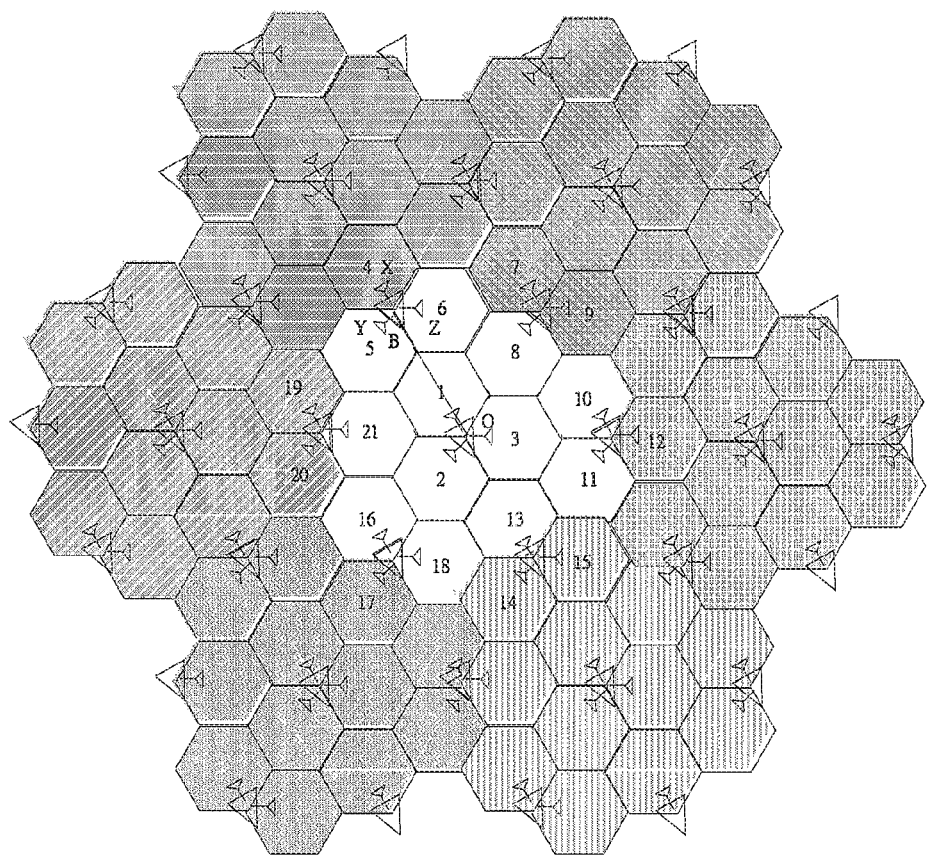
FIG. 7 illustrates a schematic diagram of partitioning an outer area according to a second embodiment of the present invention.

FIG. 7 illustrates a schematic diagram of partitioning an outer area according to a second embodiment of the present invention, wherein cells 4, 5, 6, 7, 9, 10, 11, 12, 14, 15, 16, 17, 18, 19 and 20 within the outer area as illustrated in FIG. 6 are partitioned. As illustrated in FIG. 7, the antenna directions of the cells within the outer area are directions X, Y, and Z, respectively. With cells 4, 5, and 6 within the outer area as an example, a connection line BO is made between the base station location B as a start point and a center O of the coordination area as an end point, and the antenna direction X and the connection line BO forms an obtuse angle, so the cell 4 governed by the antenna with the direction X belongs to an outward area; the antenna direction Y and the connection line BO forms an acute angle, so the cell 5 governed by the antenna with the direction Y belongs to an inward area; the antenna direction Z and the connection line BO form an acute angle, so the cell 6 governed by the antenna with the direction Z belongs to the inward area. According to the above approach, other cells within the outer area are partitioned into the outward area and the inward area. Finally, the outward area includes: cells 4, 7, 9, 12, 14, 15, 17, 19 and 20, and the inward area comprises: cells 5, 6, 10, 11, 16 and 18.

Afterwards, according to step S105, the initial coordination area comprising cells 1 to 21 is re-determined as a new coordination area including the following cells: cells 1, 2, 3, 8, 13, 21 of the inward area and cells 5, 6, 10, 11, 16, 18 of the inward area in the outer area.

Finally, a whole-network conjoining is performed with the new coordination area as the basic unit. Because the whole-network conjoining is seamless, 7 coordination areas are finally determined. Different line types are used in FIG. 7 to distinguish the 7 coordination areas, respectively.

Figure 8:
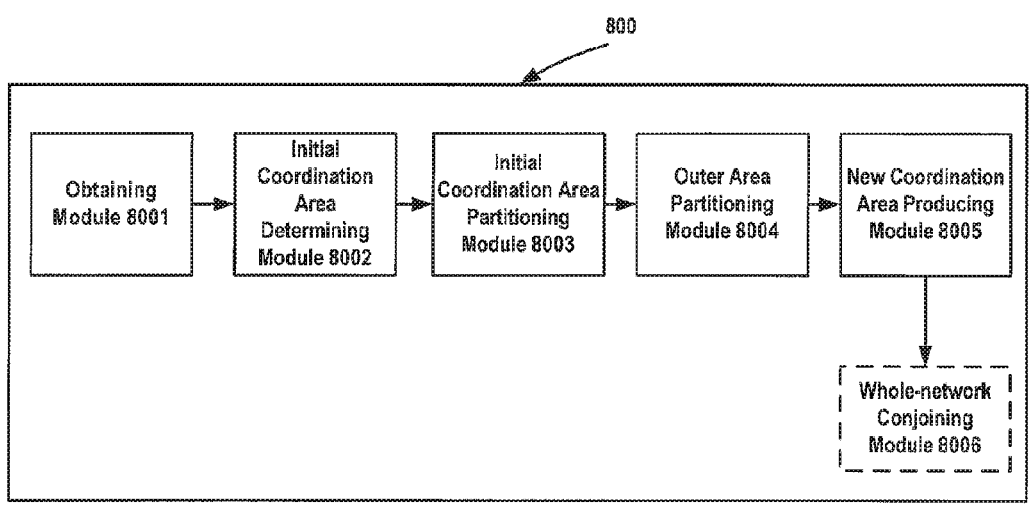
FIG. 8 illustrates an apparatus for partitioning a coordination area according to the embodiments of the present invention.

Based on the same inventive concept, the present invention provides an apparatus for partitioning a coordination area in a wireless network. FIG. 8 illustrates an apparatus of partitioning a coordination area according to the embodiments of the present invention, the apparatus comprising: an obtaining module 8001 configured to obtain antenna directions of respective cells, base station locations of respective cells, and scope of a coordination area within the wireless network; an initial coordination area determining module 8002 configured to determine an initial coordination area based on the scope of the coordination area and the base station locations in respective cells; an initial coordination area partitioning module 8003 configured to partition the initial coordination area into an inner area and an outer area; an outer area partitioning module 8004 configured to partition the outer area into an inward area and an outward area based on the antenna directions of cells within the outer area and the base station locations of cells within the outer area; and a new coordination area producing module 8005 configured to combine the inner area and the inward area within the outer area into a new coordination area.

Herein, the inner area comprises a cell that is within the initial coordination area but not adjacent to another coordination area, and the outer area comprises a cell that is within the initial coordination area and adjacent to another coordination area.

According to the embodiments of the present invention, the outer area partitioning module 8004 is configured to: making a connection line between a base station location of a cell within the outer area as a start point and a center of the initial coordination area as an end point, wherein if an angle between the connection line and a direction of an antenna of the cell within the outer area is acute, the area governed by the antenna of the cell belongs to the inward area; if an angle between the connection line and a direction of an antenna of the cell within the outer area is right or obtuse, the area governed by the antenna of the cell belongs to the outward area.

According to the embodiments of the present invention, the apparatus further comprises a whole-network conjoining module 8006 configured to perform a whole-network conjoining with the new coordination area as a basic unit. Wherein the whole-network conjoining module 8006 is configured to determine the new coordination area as a final coordination area if the whole-network conjoining is seamless; and to include at least a part of the outward area of the outer area into the new coordination area so as to form a seamless whole-network conjoining if the whole-network conjoining is not seamless.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of partitioning a coordination area in a wireless network, comprising:
   obtaining antenna directions of respective cells, base station locations of the respective cells, and scope of a coordination area within the wireless network;
   determining an initial coordination area based on the scope of the coordination area and the base station locations in the respective cells;
   partitioning the initial coordination area into an inner area and an outer area, wherein the inner area and the outer area each comprise at least two cells;
   partitioning the outer area into an inward area and an outward area based on the antenna directions of cells within the outer area and the base station locations of the respective cells within the outer area, wherein a portion of each of the respective cells in the outer area is disposed in the inward area; and
   combining the inner area and the inward area within the outer area into a new coordination area.

2. The method according to claim 1, wherein the inner area comprises a cell that is within the initial coordination area but not adjacent to other coordination areas, and the outer area comprises a cell that is within the initial coordination area and adjacent to other coordination areas.

3. The method according to claim 1, further comprising: performing a whole-network conjoining with the new coordination area as a basic unit.

4. The method according to claim 3, wherein performing a whole-network conjoining with the new coordination area as a basic unit comprises:
   including at least a part of the outward area of the outer area into the new coordination area so as to form a seamless whole-network conjoining.

5. An apparatus for partitioning a coordination area in a wireless network, comprising:
   an obtaining module configured to obtain antenna directions of respective cells, base station locations of the respective cells, and scope of a coordination area within the wireless network;
   an initial coordination area determining module configured to determine an initial coordination area based on the scope of the coordination area and the base station locations of the respective cells;
   an initial coordination area partitioning module configured to partition the initial coordination area into an inner area and an outer area, wherein the inner area and the outer area each comprise at least two cells;
   an outer area partitioning module configured to partition the outer area into an inward area and an outward area based on the antenna directions of cells within the outer area and the base station locations of the respective cells within the outer area, wherein a portion of each of the respective cells in the outer area is disposed in the inward area; and
   a new coordination area producing module configured to combine the inner area and the inward area within the outer area into a new coordination area.

6. The apparatus according to claim 5, wherein the inner area comprises a cell that is within the initial coordination area but not adjacent to other coordination areas, and the outer area comprises a cell that is within the initial coordination area and adjacent to other coordination areas.

7. The coordination system according to claim 5, the method further comprising:
   performing a whole-network conjoining with the new coordination area as a basic unit.

8. The coordination system according to claim 7, wherein performing the whole-network conjoining with the new coordination area as the basic unit comprises including at least a part of the outward area of the outer area into the new coordination area so as to form a seamless whole-network conjoining.

9. A non-transitory computer readable storage medium tangibly embodying a computer readable program code for partitioning a coordination area in a wireless network having computer readable instructions which, when implemented, cause a computer device to by:
   obtain an antenna direction for each of a plurality of respective cells, a base station location for each of the plurality of respective cells, and a scope of a coordination area within the wireless network;
   determine an initial coordination area based on the scope of the coordination area and the base station location in each of the plurality of respective cells;
   partition the initial coordination area into an inner area and an outer area, wherein the inner area and the outer area each comprise at least two cells;
   partition the outer area into an inward area and an outward area based on the plurality of antenna directions of the plurality of respective cells within the outer area and the plurality of base station locations of the plurality of respective cells within the outer area, wherein a portion of each of the plurality of respective cells in the outer area is disposed in the inward area; and
   combine the inner area and the inward area within the outer area into a new coordination area.

10. The computer readable storage medium according to claim 9, wherein:
    the inner area comprises a cell that is within the initial coordination area but not adjacent to other coordination areas; and
    the outer area comprises the cell that is within the initial coordination area and adjacent to other coordination areas.

11. The computer readable storage medium according to claim 9, wherein the computer readable instructions which, when implemented, further cause a computer device to perform a whole-network conjoining with the new coordination area as a basic unit.

12. The computer readable storage medium according to claim 11, wherein performing the whole-network conjoining with the new coordination area as the basic unit comprises including at least a part of the outward area of the outer area into the new coordination area so as to form a seamless whole-network conjoining.

* * * * *